March 1, 1960     G. TARBUTTON ET AL     2,926,999
RECOVERY OF SULFUR DIOXIDE FROM WASTE GASES
Filed Feb. 24, 1958
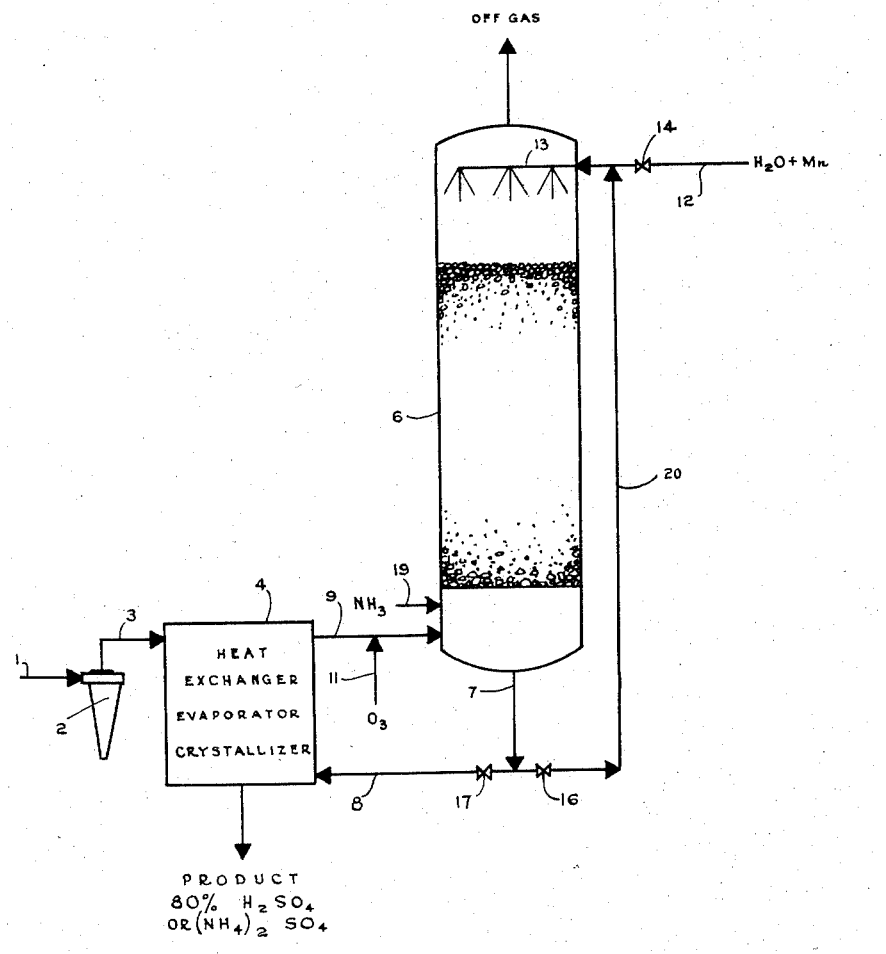
Grady Tarbutton
John G. Driskell
Thomas M. Jones    INVENTORS.
Carter M. Smith
BY Bentley C. Morrow
Attorney United States Patent Office 2,926,999
Patented Mar. 1, 1960

2,926,999

RECOVERY OF SULFUR DIOXIDE FROM WASTE GASES

Grady Tarbutton, John C. Driskell, and Thomas M. Jones, Sheffield, and Carter M. Smith, Florence, Ala., assignors to Tennessee Valley Authority, a corporation of the United States Application February 24, 1958, Serial No. 717,280

6 Claims. (Cl. 23—178)

(Granted under Title 35, U.S. Code (1952), sec. 266)

The invention herein described may be manufactured and used by or for the Government for governmental purposes without the payment to us of any royalty therefor.

This invention is an improved process for the recovery of sulfur dioxide from waste gases in which this oxide is present in low concentration.

Sulfur dioxide is a constituent of many waste gases such as smelter gases, offgases from many chemical processes, and stack gases from coal-burning furnaces. Many methods have been proposed for removing sulfur dioxide from waste gases when its concentration in such gases is well above 1 percent, but the known methods have been impractical when applied to gases containing less than 1 percent $SO_2$.

The total quantity of sulfur dioxide contained in waste gases may be very large, although its concentration in such gases is below 1 percent. For example, a modern electric power plant of 1,350,000 kw. capacity will burn 15,000 tons of coal per day. Much coal contains about 3.5 percent sulfur, or even more. The emission of sulfur dioxide from a plant of this size using such coal would amount to about 1,000 tons per day, although the concentration of sulfur dioxide in the stack gases would be very low—about 0.3 percent.

Processes for recovering sulfur dioxide from gases have been described in U.S. Patents 2,188,324; 2,304,178; 2,-332,647; 2,342,704; and others. These processes are based upon catalytic oxidation of sulfur dioxide to sulfur trioxide, formation of sulfuric acid by reaction between sulfur trioxide and water, and optionally further reaction of sulfuric acid to form sulfates. Although waste gases containing 1 to 3.5 percent $SO_2$ often are treated to remove the sulfur dioxide by methods such as those shown in the patents mentioned above, those gases containing less than 1 percent, apparently without exception, are discarded.

In a number of installations in England, sulfur dioxide is scrubbed from stack gases from furnaces burning high sulfur coal with a suspension of chalk, merely to abate the nuisance. The resulting calcium compounds are discarded. No practical method for the recovery of sulfur dioxide in usable form from coal gases has been used commercially.

The reason for this lies in the fact that prior processes have required such large and expensive equipment and have involved the pumping of such enormous quantities of liquids and gases against considerable pressure that they are impractical when applied to waste gases containing as little as 1 percent sulfur dioxide.

Thus, the unsolved problem has been to find some economically feasible process for recovering substantially all sulfur dioxide in useful form from waste gases containing 1 percent or less of sulfur dioxide.

It is an object of this invention to provide a process for the recovery of sulfur dioxide from waste gases in which size of equipment and necessity for pumping are greatly reduced.

Another object is to provide such process in which high absorption efficiency is attained.

Another object is to provide such process in which unusually high catalytic oxidation rates may be maintained easily.

Still another object is to provide such process which is economically feasible, and in which the sulfur dioxide is recovered in useful form.

Other objects and advantages of our invention will become apparent as this disclosure proceeds.

We have found that these advantages are attained in a process which comprises adding about 20 to 80 parts per million ozone to a gaseous mixture at a temperature above the dew point of the mixture and below the boiling point of a later-mentioned absorption medium, said gaseous mixture containing a small proportion of sulfur dioxide and at least enough oxygen to convert the sulfur dioxide to sulfur trioxide and being free from substantial amounts of copper and phenolic compounds; passing the resulting gaseous mixture upward through a packed absorption tower; passing a liquid absorption medium comprising an aqueous solution of manganese ion and a material selected from the group consisting of sulfuric acid and ammonium sulfate down in a film over surfaces of packing in the tower in intimate contact with ascending gases; maintaining a gas-liquid contact time of about 8 to 36 seconds; maintaining a temperature in the tower below the boiling point of the liquid; and withdrawing a liquid effluent, high in sulfate ion content, from a lower part of the tower.

We have found that by proceeding in this manner the quantity of liquid pumped may be reduced to less than 1 percent of that formerly necessary when using manganese catalyst promoted by ozone, and no pumping of gases against large pressure drops is required. Also, we have found that the efficiency of ozone in promoting catalytic oxidation of sulfur dioxide to sulfur trioxide is greatly enhanced and the recovery of sulfur is greatly increased by introducing the ozone into the waste gases at or near the bottom of the packed tower.

We have found that a single pass of waste gases containing a small proportion of sulfur dioxide through a packed tower results in substantially complete recovery of the sulfur dioxide when treated as described above. Lead, alumina, hydrogen fluoride, hydrogen chloride, carbon monoxide, and fly ash do not interfere. However, copper and certain phenolic compounds do interfere; and their presence may cause the requirement for ozone to be increased to an impractical quantity. Thus, our process is limited in practical application to waste gases that do not contain substantial quantities of these last-mentioned materials.

The product withdrawn from the bottom of the tower may be either sulfuric acid or ammonium sulfate, as desired. When ammonium sulfate is the product wanted, anhydrous ammonia is introduced into and mixed with the gases passed upward through the tower in quantity sufficient to substantially neutralize the sulfuric acid formed, but leaving the solution sufficiently acidic to prevent loss of ammonia and absorption of carbon dioxide. Alternatively, ammonium hydroxide may be introduced into the scrubbing liquid in the tower, in equivalent proportion.

When sulfuric acid is the product desired, the rate of flow of absorbing liquid and gases is adjusted to give a concentration of sulfuric acid of about 15 to 40 percent in the withdrawn product. We have found that the completeness of recovery of sulfur dioxide decreases with increasing acid strength, so that the maximum practical strength of the absorption tower effluent is limited to about 30 to 40 percent if recovery is to be substantially complete. When the acid is neutralized in the tower to form ammonium sulfate, relative rates of flow within the tower and rate of recycle of product can be adjusted to give any concentration in the absorption tower effluent desired, up to saturation.

Waste gases emitted from various processes in which sulfur dioxide is evolved usually are hot. Sensible heat of these waste gases may be utilized in concentrating sulfuric acid absorption tower effluent to 60° Bé. or more, or can be used to crystallize ammonium sulfate. A trace of manganese sulfate, present in the absorption tower effluent, is left in the product.

In the attached drawing, the single figure is a flow sheet diagrammatically illustrating principles of our invention. The reference numeral 1 indicates a conduit conducting waste gases containing small amounts of sulfur dioxide from any suitable source, not shown. Such waste gases may be stack gases from coal-burning furnaces, offgases from smelters, tail gases from sulfuric acid plants, or other waste gases which do not contain substantial quantities of copper and phenolic compounds. Such gases are usually relatively hot when evolved.

The gases are led to an optional dust-removal step 2. If contamination of the product by dust is immaterial, this step may be omitted. If hot, the waste gases are passed by line 3 to an optional heat-exchange step where their sensible heat is utilized in evaporating water from an effluent withdrawn from a packed absorption tower 6 by lines 7 and 8. The gases are not cooled below their dew point in this step, since condensation here leads to dilution of the product.

Cool waste gases at temperatures above their dew point are passed to absorption tower 6 by line 9. Ozone from a source not shown is introduced into the stream of gases by line 11. This ozone functions as a promoter of manganese catalyst in tower 6. The quantity of ozone introduced is controlled to give a concentration of about 20 to 80 parts per million in the waste gases. We have found that efficiency of ozone utilization increases as the lower limit of this range is approached, while completeness of recovery of sulfur dioxide is increased in the upper part of the range. We have also found that about 40 parts per million is a desirable compromise between inefficient use of expensive ozone and complete recovery of sulfur dioxide.

A dilute solution of manganese ions is introduced into the top of packed tower 6 by line 12 and any suitable distributing device 13.

The concentration of manganese ion required is quite low; 0.03 percent is sufficient. Quantities up to 0.3 percent may be used, but the excess is not advantageous. The quantity of solution introduced is just sufficient to keep the packing in the tower completely wetted and to maintain a slow rate of flow down over the surfaces of the packing.

The relative rates of flow of gases, recycled absorbent solution, and makeup water introduced at the top of tower 6 are adjusted to produce an effluent of the desired concentration from the bottom of the tower. As previously noted, we have found that the completeness of recovery of sulfur dioxide decreases with increasing acid strength, so that the maximum practical strength of the absorption tower effluent is limited to about 30 to 40 percent if recovery is to be substantially complete. Therefore, in the instance where the absorbent solution which is recycled contains little or no sulfuric acid, as may be the case when our process is first initiated, the efficiency of the recycling absorbent solution is highest. As our process proceeds, the sulfuric acid concentration in the recycled absorbent solution increases with a resulting decrease in the completeness of recovery of the sulfur dioxide. We have therefore found it practical to withdraw the effluent when the recycled absorbent solution reaches a concentration of about 16 percent to 30 percent sulfuric acid, and that the maximum practical strength of the absorption tower effluent is limited to about 30 percent to 40 percent if recovery of sulfur dioxide is to be substantially complete.

Gases passing upward through tower 6 should have a contact time of about 8 to 36 seconds with liquid passing down over the surfaces of the packing, or preferably about 12 to 36 seconds when sulfuric acid is the product, and about 8 to 12 seconds when ammonia is added in the tower. The range from about 18 to 24 seconds is best when sulfuric acid is produced. The contact time is predetermined by choosing an absorption tower having a total volume of voids sufficient to give the desired time with the known rate of evolution of waste gases on the basis of standard temperature and pressure. The rate of downward flow of liquid is controlled by valves 14 and 16.

Temperatures within the absorption tower may be anything between the dew point of the waste gases and incipient boiling. We prefer to operate with temperatures in the range from about 55° to 75 C., rather than near the boiling point, both to reduce corrosion and to secure a little more complete recovery of sulfur dioxide.

When sulfuric acid is the product desired, the rate of flow of liquid absorbent in tower 6 is adjusted to give a concentration of about 16 to 30 percent $H_2SO_4$ in the effluent withdrawn by line 7. Above 30 percent $H_2SO_4$ the recovery of sulfur dioxide becomes incomplete, and at concentrations below 16 percent $H_2SO_4$ sensible heat of incoming waste gases usually is insufficient to concentrate this effluent to 60° Bé. in heat-exchange step 4. In order to achieve the desired concentration and maintain sufficient flow to keep the packing properly wetted, it is necessary to divide the stream of effluent withdrawn by line 7 by proper adjustment of valves 16 and 17 and to recycle part of the liquid by line 20.

When ammonium sulfate is the product desired, ammonia in quantity sufficient to neutralize the sulfuric acid formed to a stage of sight acidity is introduced into tower 6 by line 19. When anhydrous ammonia is used, line 19 enters a lower part of tower 6, as shown, and the ammonia is introduced into the ascending gases. When ammonium hydroxide is used, line 19 enters near the top of tower 6 and the ammonium hydroxide is introduced into the descending liquid. Ammonium sulfate is the preferred product when the waste gases being treated are stack gases from coal-burning furnaces. Such gases usually contain phenolic compounds which poison the manganese oxidation catalyst. We have found that the poisoning effect of phenolic compounds on the manganese catalyst is much less in the presence of ammonium sulfate and low acidity. The concentration of ammonium sulfate solution withdrawn by line 7 is not limited to about 30 percent but can be anything desired up to substantial saturation.

When either sulfuric acid or ammonium sulfate is produced, recovery of sulfur dioxide from waste gases containing as little as 0.17 percent is substantially complete in our process. An effluent from the absorption tower which is high in sulfate ion is produced under conditions that require less than 1 percent of pumping of liquids, and the pressure head against which the treated gas is pumped is much less than that which has characterized other methods. The effluents are in condition to be converted into salable products economically.

The following examples are illustrative of particular applications of our process.

*Example 1*

A gaseous mixture containing 0.35 percent sulfur dioxide, 3.5 percent oxygen, 16 percent carbon dioxide, and 80 percent nitrogen was absorbed in dilute sulfuric acid containing manganese ion in a glass tower packed with ⅜-inch Berl saddles. Air was passed through a glass ozonizer to yield a mixture containing 1 percent ozone. This mixture was added to the incoming gaseous mixture in quantity sufficient to give the proportions of ozone recorded in the following table. Absorption temperatures were maintained in the range from 55° to 75° C. The following results were obtained.

| O₃ in input gas, p.p.m. | Retention time, seconds | Composition of scrubber liquor | | Gas-to-liquor ratio | SO₂ recovery, percent | Ozone efficiency [1] |
|---|---|---|---|---|---|---|
| | | Mn, gm./ 100 gm. H₂O | H₂SO₄, percent | | | |
| 40 | 24 | 0.3 | 30 | 250 | 78 | 68 |
| | 12 | .3 | 30 | 250 | 47 | 43 |
| | 36 | .3 | 30 | 1,500 | 100 | 200 |
| 20 | 36 | .03 | 30 | 1,500 | 100 | 200 |
| | 36 | .03 | 30 | 3,000 | 90 | 160 |

[1] Moles SO₂ recovered per mole O₃ added.

Ozone efficiency increased with decrease in proportion of ozone and increase in retention time. In other similar tests it was shown that both sulfur dioxide recovery and ozone efficiency were generally higher when more dilute acid was used as the absorption medium. Variation in temperature within the limits of 55° to 75° C. had no measurable effect on the efficiency of the process.

*Example II*

A gas of the same composition described in Example I was passed through the same absorption tower. Ozone was added to the gas in quantity sufficient to give a concentration of about 30 parts per million. Sulfur dioxide was absorbed from the gas by a 20 to 30 percent solution of ammonium sulfate containing 0.3 gram manganese per 100 grams of water. This solution was maintained at slight acidity to prevent absorption of carbon dioxide and loss of ammonia. When the retention time was 18 to 36 seconds, 75 to 100 percent of the sulfur dioxide was recovered in a single pass.

Phenol vapor was added to the incoming gas to give a concentration of 0.1 percent. The adverse effect of phenol on sulfur dioxide recovery was found to be much less with the ammonium sulfate solution than in the preparation of sulfuric acid.

In tests using combustion gases from a coal burner, under steady-state conditions and using similar ammonium sulfate solution, 64 percent of the sulfur dioxide content of the combustion gases was recovered when the retention time was 8.4 seconds and 20 parts per million of ozone was used.

We claim as our invention:

1. A process for the recovery of sulfur dioxide from waste gases which comprises adding about 20 to 80 parts per million ozone to a gaseous mixture at a temperature above the dew point of the mixture and below the boiling point of a later-mentioned absorption medium, said gaseous mixture containing a small proportion of sulfur dioxide and at least enough oxygen to convert the sulfur dioxide to sulfur trioxide and being free from substantial amounts of copper and phenolic compounds; passing the resulting gaseous mixture upward through a packed absorption tower; passing a liquid absorption medium comprising an aqueous solution of manganese ion and a material selected from the group consisting of sulfuric acid and ammonium sulfate down in a film over surfaces of packing in the tower in intimate contact with ascending gases; maintaining a gas-liquid contact time of about 8 to 36 seconds; maintaining a temperature in the tower below the boiling point of the liquid; and withdrawing a liquid effluent, high in sulfate ion content, from a lower part of the tower.

2. A process for the recovery of sulfur dioxide from waste gases which comprises adding about 20 to 80 parts per million ozone to a gaseous mixture at a temperature above the dew point of the mixture and below the boiling point of a later-mentioned absorption medium, said gaseous mixture containing sulfur dioxide in a proportion less than 1 percent and at least enough oxygen to convert the sulfur dioxide to sulfur trioxide and being free from substantial amounts of copper and phenolic compounds; passing the resulting gaseous mixture upward through a packed absorption tower; passing a liquid absorption medium comprising an aqueous solution containing from about 0.03 percent to 0.3 percent of manganese ion and a material selected from the group consisting of sulfuric acid and ammonium sulfate down in a film over surfaces of packing in the tower in intimate contact with ascending gases; maintaining a gas-liquid contact time of about 8 to 36 seconds; maintaining a temperature in the tower in the range from about 55° to 75° C.; and withdrawing a liquid effluent, high in sulfate ion content from a lower part of the tower.

3. A process for the recovery of sulfur dioxide from waste gases which comprises adding about 20 to 80 parts per million ozone to a gaseous mixture at a temperature above the dew point of the mixture and below the boiling point of a later-mentioned absorption medium, said gaseous mixture containing sulfur dioxide in a proportion less than 1 percent and at least enough oxygen to convert the sulfur dioxide to sulfur trioxide and being free from substantial amounts of copper and phenolic compounds; passing the resulting gaseous mixture upward through a packed absorption tower; passing a liquid absorption medium comprising an aqueous solution containing from about 0.03 percent to 0.3 percent of manganese ion and from about 0.0 percent to 30 percent sulfuric acid down in a film over the surfaces of packing in the tower in intimate contact with ascending gases; maintaining a gas-liquid contact time of about 12 to 36 seconds; maintaining a temperature in the tower below the boiling point of the liquid; and withdrawing sulfuric acid having a concentration of about 16 percent to 30 percent $H_2SO_4$ from a lower part of the tower.

4. A process for the recovery of sulfur dioxide from waste gases which comprises passing hot waste gases containing sulfur dioxide in a proportion less than 1 percent and at least enough oxygen to convert the sulfur dioxide to sulfur trioxide and free from substantial amounts of copper and phenolic compounds in indirect heat-exchange relationship with a liquid effluent from a later absorption step; simultaneously evaporating water from the liquid effluent and cooling the gaseous mixture to a temperature a little above its dew point; adding about 20 to 80 parts per million ozone to the cooled gaseous mixture; passing the resulting gaseous mixture upward through a packed absorption tower; passing a liquid absorption medium comprising an aqueous solution of from about 0.0 percent to 30 percent sulfuric acid containing from about 0.03 percent to 0.3 percent of manganese ion down in a film over surfaces of packing in the tower in intimate contact with ascending gases; maintaining a gas-liquid contact time of about 18 to 24 seconds; maintaining a temperature in the tower in the range from about 55° to 75° C.; withdrawing a liquid effluent containing about 16 percent to 30 percent $H_2SO_4$ from the tower; and concentrating the effluent to at least 60 Bé. by evaporation of water in the earlier-mentioned heat-exchange step.

5. A process for the recovery of sulfur dioxide from waste gases which comprises adding about 20 to 80 parts per million ozone to a gaseous mixture at a temperature above the dew point of the mixture and below the boiling point of a later-mentioned absorption medium, said gaseous mixture containing a small proportion of sulfur dioxide and at least enough oxygen to convert the sulful dioxide to sulfur trioxide and being free from substantial amounts of copper and phenolic compounds; passing the resulting gaseous mixture upward through a packed absorption tower; introducing ammonia into the tower at a rate sufficient to neutralize sulfuric acid formed to a slight degree of acidity; passing a liquid absorption medium comprising a slightly acid aqueous solution containing from about 0.03 percent to 0.3 percent of manganese ion and ammonium sulfate down in a film over surfaces of packing in the tower in intimate contact with ascending gases; maintaining a gas-liquid contact time of about 8 to 12 seconds; maintaining a temperature in the tower below the boiling point of liquid in the tower and above the dew point of gases introduced therein; and withdrawing a liquid effluent, high in ammonium sulfate content, from a lower part of the tower.

6. A process for the recovery of sulfur dioxide from waste gases which comprises passing a mixture of hot waste gases containing sulfur dioxide in a proportion less than 1 percent and at least enough oxygen to convert the sulfur dioxide to sulfur trioxide and free from substantial amounts of copper and phenolic compounds in indirect heat-exchange relationship with a liquid effluent from a later absorption step; simultaneously evaporating water from the liquid effluent and cooling the mixture of hot waste gases to a temperature a little above its dew point; adding about 20 to 80 parts per million ozone to the gaseous mixture at a temperature above the dew point of the mixture and below the boiling point of a later-mentioned absorption medium; passing the resulting gaseous mixture upward through a packed absorption tower; introducing ammonia into the tower at a rate sufficient to neutralize sulfuric acid formed to a slight degree of acidity; passing a liquid absorption medium comprising an aqueous solution containing from about 0.03 percent to 0.3 percent of manganese ion and ammonium sulfate down in a film over surfaces of packing in the tower in intimate cotact with ascending gases; maintaining a gas-liquid contact time of about 8 to 12 seconds; maintaining a temperature in the tower in the range from about 50° to 75° C.; withdrawing a liquid effluent, high in ammonium sulfate content, from a lower part of the tower; and crystallizing ammonium sulfate from the effluent in the earlier-mentioned heat-exchange step.

References Cited in the file of this patent

UNITED STATES PATENTS

| 1,566,379 | Keyser | Dec. 22, 1925 |
| 2,021,936 | Johnstone | Nov. 26, 1935 |

OTHER REFERENCES

Tarbutton et al.: "Recovery of Sulfur Dioxide from Flue Gases," Industrial and Engineering Chemistry, volume 49, No. 3, March 1957, pp. 392–395.